(12) United States Patent
Duan et al.

(10) Patent No.: US 8,634,208 B2
(45) Date of Patent: Jan. 21, 2014

(54) CHIP CARD HOLDING MECHANISM AND PORTABLE ELECTRONIC DEVICE

(75) Inventors: Ju-Ping Duan, Shenzhen (CN); Ming-Fu Luo, Shenzhen (CN); Fa-Guang Shi, Shenzhen (CN)

(73) Assignees: Fu Tai Hua Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 287 days.

(21) Appl. No.: 13/303,377

(22) Filed: Nov. 23, 2011

(65) Prior Publication Data

US 2013/0033845 A1 Feb. 7, 2013

(30) Foreign Application Priority Data

Aug. 5, 2011 (CN) .......................... 2011 1 0223579

(51) Int. Cl.
*H05K 5/00* (2006.01)

(52) U.S. Cl.
USPC ................ 361/807; 361/679.38; 361/679.39; 361/679.41; 361/737; 361/752; 361/754

(58) Field of Classification Search
USPC ................ 361/679.38, 679.39, 679.41, 807; 439/159, 160, 377, 630, 945, 946, 947
See application file for complete search history.

(56) References Cited

U.S. PATENT DOCUMENTS

2009/0267677 A1* 10/2009 Myers et al. .................. 327/356
2012/0196462 A1* 8/2012 Henry et al. .................. 439/159

* cited by examiner

*Primary Examiner* — Tuan T Dinh
*Assistant Examiner* — Mukund G Patel
(74) *Attorney, Agent, or Firm* — Altis Law Group, Inc.

(57) ABSTRACT

A portable electronic device includes a housing and a chip card holding mechanism assembled within the housing. The housing defines a mounting slot and an unlocking hole adjacent to the mounting slot. The chip card holding mechanism includes a support base assembled adjacent to the mounting slot, a receiving tray and an unlocking assembly. The receiving tray is slidably mounted on the support base and includes a tray body and an operating portion formed at one end of the tray body. The operating portion has a resisting surface. The unlocking assembly includes a cam body rotatably assembled to the housing and a driving member. The cam body forms a cam resisting portion resisting against the resisting surface of the receiving tray. The driving portion is inserted into the unlocking hole for driving the cam body to rotate thereby ejecting the receiving tray.

17 Claims, 4 Drawing Sheets

CHIP CARD HOLDING MECHANISM AND PORTABLE ELECTRONIC DEVICE

BACKGROUND

1. Technical Field

The present disclosure relates to holding mechanisms, particularly to a chip card holding mechanism for a portable electronic device.

2. Description of Related Art

Portable electronic devices such as mobile phones and tablet computers, typically employ at least one chip card (e.g., SIM card) to perform multiple functions including storing information, connecting to the internet, and dialing calls. It is necessary to provide a chip card holding mechanism for holding/securing the chip card within the portable electronic device. The chip card holding mechanism usually defines a receiving space, an elastic sheet fitted in the receiving space, and a holding portion rotatably assembled on the housing of the portable electronic device. The chip card can be received and held in the receiving space by the holding member, with the chip card resisting the elastic sheet. When detaching or replacing the chip card, the user must detach the outer cover of the portable electronic device first, thereby exposing the chip card holding mechanism. Thus, it is inconvenient to detach and replace the chip card. In addition, the existing chip card holding mechanism has a complex structure. The chip card holding mechanism may not unlock if the pressure applied is not strong enough to rotate the holding member. On the other hand, too much pressure on the cover may cause damage.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of chip card holding mechanism and portable electronic device using the same. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
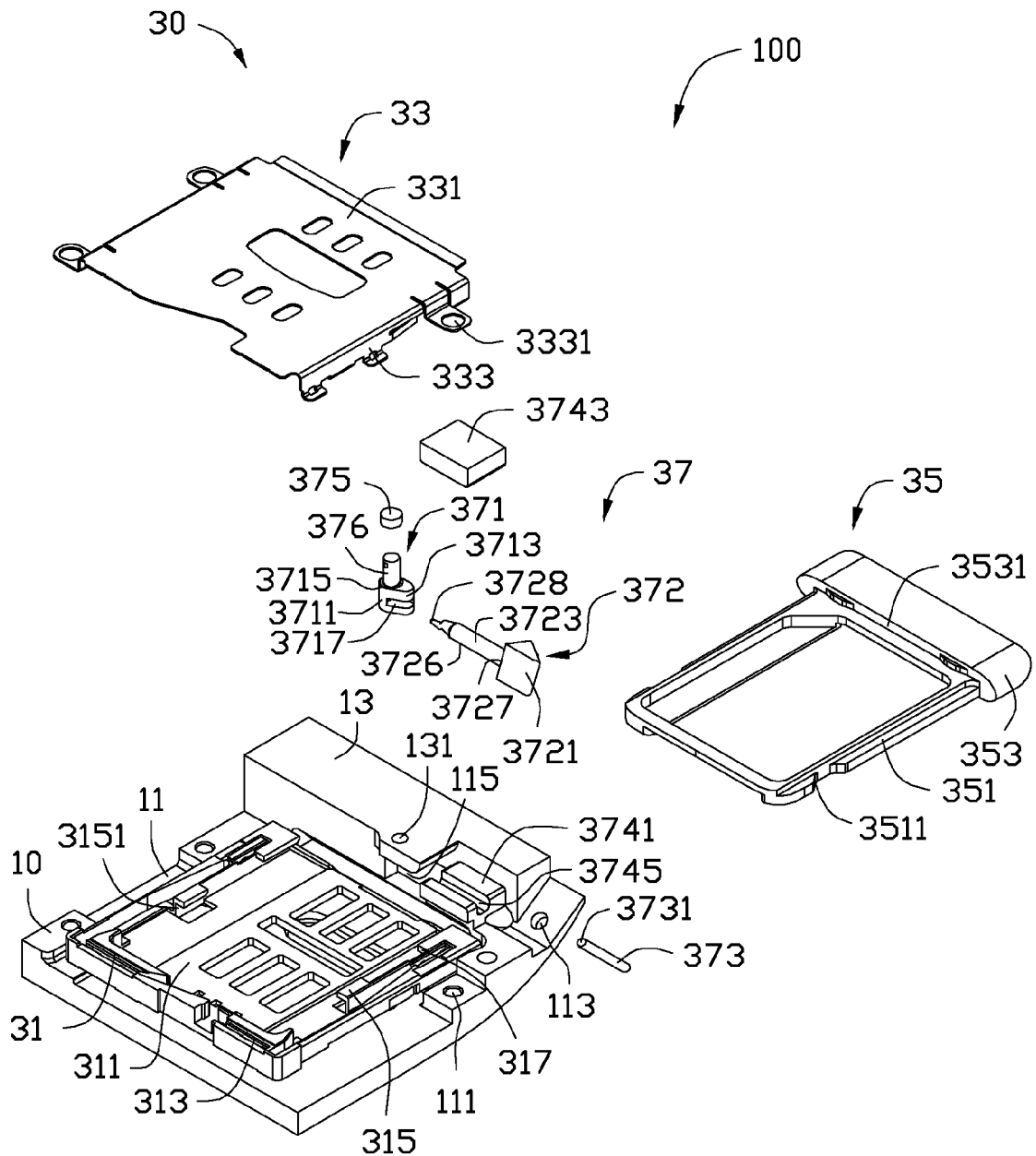
FIG. 1 is an exploded isometric view of an embodiment of a portable electronic device.
Figure 2:
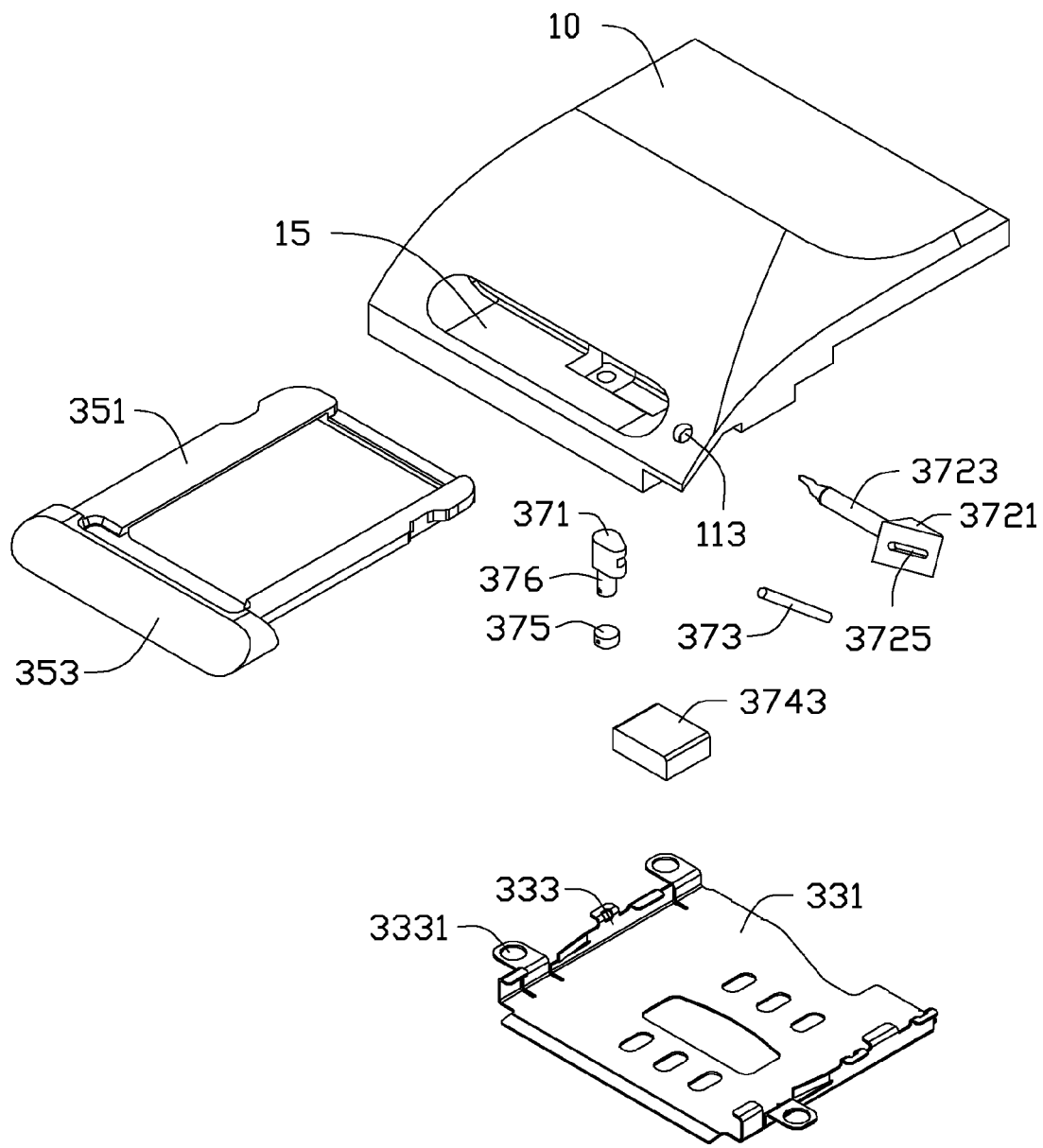
FIG. 2 is similar to FIG. 1, but viewed from another aspect.

Referring to FIGS. 1 and 2, an embodiment of a portable electronic device 100 includes a housing 10 (partially shown in the FIGS. 1 and 2), and a chip card holding mechanism 30 mounted on the housing 10 for holding a chip card (not shown). The portable electronic device 100 includes various modules for performing specific functions. However, for simplicity, only the modules related to the chip card holding mechanism 30 are described. The portable electronic device 100 may be a mobile phone, a tablet computer, or other electronic device. The chip card may be one of various types of cards such as an SD Card, a multimedia card (MMC Card), or a SIM Card. In the illustrated embodiment, the electronic device 100 is a tablet computer, and the chip card is a SIM card.

The housing 10 includes a support portion 11 and a fixing portion 13 formed on one end of the support portion 11. The support portion 11 and the fixing portion 13 cooperatively define a receiving space 115 for assembling the chip card holding mechanism 30. A substantially bar-shaped mounting slot 15 is defined through the fixing portion 13 and communicates with the receiving space 115. A plurality of fixing holes 111 are oppositely defined at two sides of the support portion 11 and an unlocking hole 113 is defined through the support portion 11 and positioned adjacent to the mounting slot 15. A mounting hole 131 is defined through the fixing portion 13 and is positioned between the mounting slot 15 and the receiving space 115.

The chip card holding mechanism 30 is mounted on the support portion 11 and received within the receiving space 115 of the housing 10. The chip card holding mechanism 30 includes a support base 31, a cover 33, a receiving tray 35, and an unlocking assembly 37. The support base 31 is fixedly mounted on the support portion 11 of the housing 10 together with the cover 33, and received within the receiving space 115. The cover 33 is mounted upon the support base 31 and fixed with the support portion 11. The cover 33 and the support base 31 cooperatively define a receiving chamber (not labeled) for receiving the receiving tray 35. The receiving tray 35 is detachably assembled within the receiving chamber of the housing 10 via the unlocking assembly 37 and can be ejected out or inserted into the mounting slot 15 of the housing 10.

The support base 31 includes a support body 311, a resisting portion 313, two guiding portions 315, and two latching stoppers 317. The support body 311 is a substantially rectangular board. The resisting portion 313 is formed on a distal end of the support body 311 and is installed away from the end of the mounting slot 15. The two guiding portions 315 are oppositely and parallely formed at two sides of the support body 311, and respectively form a guiding latch slot 3151 with the support body 311 along a direction substantially perpendicular to the resisting portion 313. The two latching stoppers 317 are respectively formed on the two guiding portions 315 away from the end of the resisting portion 313, and are oppositely positioned adjacent to two ends of the mounting slot 15 of the housing 10.

The cover 33 is a substantially U-shaped bent sheet, mounted upon the support base 31, and together with the support base 31, cooperatively defines the receiving chamber for receiving the receiving tray 35. The cover 33 includes a top wall 331 and two substantially L-shaped side walls 333 extending and bending away from two opposite side edges of the cover 33. A plurality of mounting holes 3331 are separately defined through the two side walls 333 corresponding to the plurality of fixing holes 111 of the support portion of the housing 10, such that the cover 33 is capable of being securely mounted to the housing 11 and installed upon the support base 30 via a plurality of fasteners (not shown).

The receiving tray 35 is detachably assembled within the receiving chamber defined by the cover 33 and the support base 31 via the unlocking assembly 37. The receiving tray 35 includes a substantially rectangular board shaped tray body 351 and an operating portion 353 formed at one end of the tray body 351. The tray body 351 defines an accommodating space (not labeled) for receiving a chip card. Two latching slots 3511 are oppositely defined in two sides of the tray body 351 corresponding to the two latching stoppers 317 of the support base 31, and are installed adjacent to the distal end of the tray body 351 and away from the end of the operating portion 353. The operating portion 353 is bar-shaped and has dimensions substantially the same as that of the mounting slot 15 of the housing 10. The receiving tray 35 is inserted and is received within the receiving chamber defined by the support base 31 and the cover 33. The operating portion 353 is received within the mounting slot 15 of the housing 10. The operating portion 353 includes a resisting surface 3531 facing the accommodating space of the tray body 351.

Figure 3:
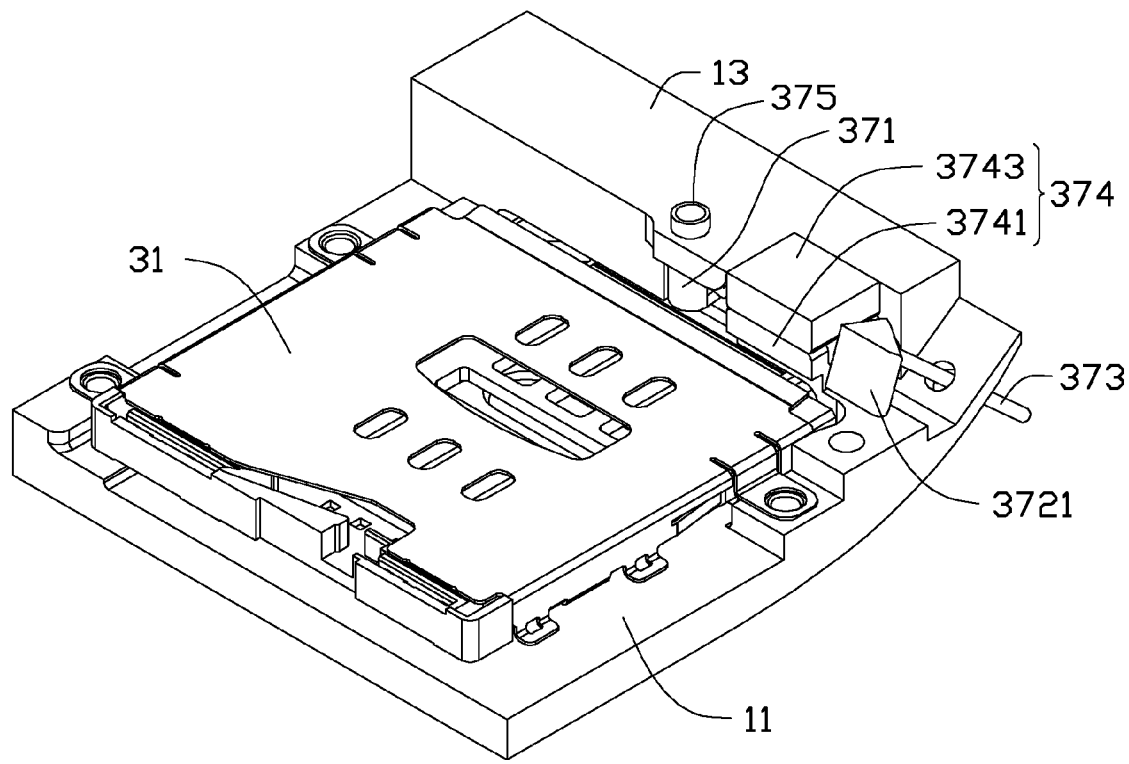
FIG. 3 is an assembled isometric view of the portable electronic device of FIG. 1.

Also referring to FIG. 3, the unlocking assembly 37 is mounted on the support base 31 and positioned adjacent to the mounting slot 15, for unlocking and ejecting the receiving tray 35 out from the housing 10. The unlocking assembly 37 includes a cam body 371, a transmission portion 372, a driving portion 373, a support portion 374, a fixing cap 375, and a pin bolt 376. The cam body 371 is rotatably assembled to the support portion 13 of the housing 10 via the pin bolt 376 and the fixing cap 375 (see FIG. 4), and positioned adjacent to the mounting slot 15. The cam body 371 includes a cam main portion 3711 and a substantially arc-shaped cam resisting portion 3713 extending from a periphery of the cam main portion 3711. A positioning hole 3715 is defined through the cam body 371 corresponding to the mounting hole 131 of the housing 10 and the pin blot 376. An engaging slot 3717 is recessed from an outer peripheral surface of the cam resisting portion 3713 along a direction substantially perpendicular to an axial direction of the positioning hole 3715 of the cam body 371.

The transmission portion 372 is slidably mounted to the housing 10 via the support portion 374 and engages with the cam body 371. The transmission portion 372 includes a substantially wedge-shaped main body 3721, and a transmission rod 3723 fixed to the wedge-shaped main body 3721. A driving slot 3725 is recessed from one surface of the wedge-shaped main body 3721. The transmission rod 3723 includes a main rod 3726, a fixing end 3727 defined on one end of the main rod 3726 and a driving end 3728 defined on the other end of the main rod 3726. The fixing end 3727 of the transmission rod 3723 is fixed to the wedge-shaped main body 3721.

Figure 4:
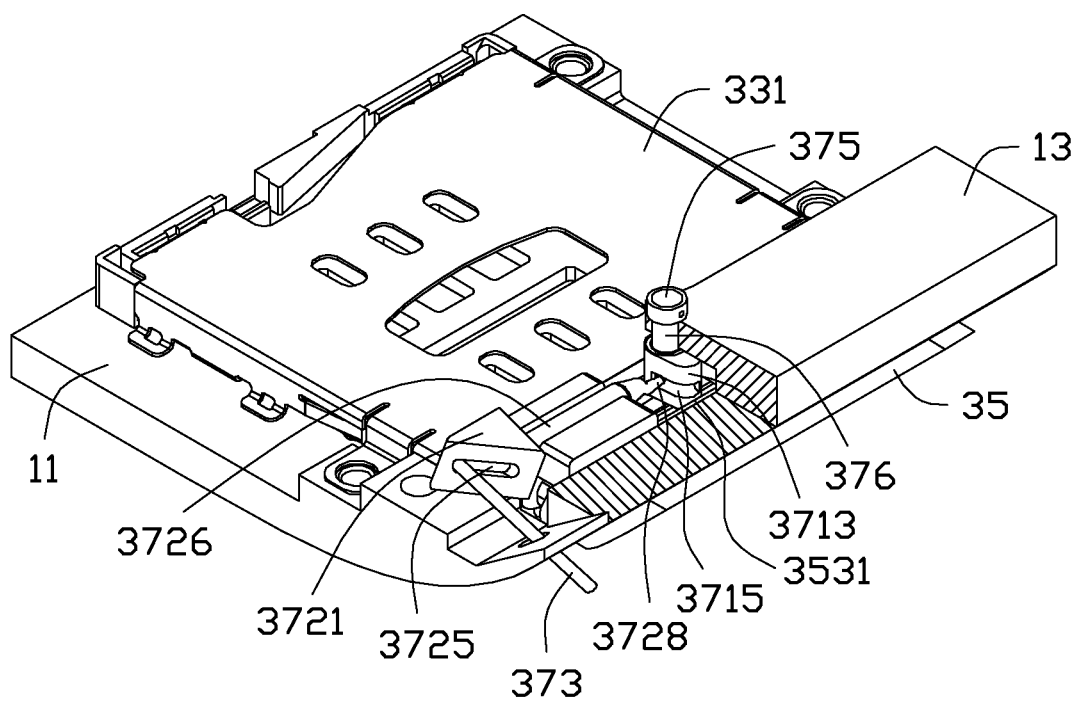
FIG. 4 is a partially, isometric cutaway view of the portable electronic device of FIG. 3.

Also referring to FIG. 4, the driving portion 373 is substantially cylindrical rod-shaped, and has a diameter substantially the same as that of the unlocking hole 113 of the housing 10. The driving portion 373 has a resisting end 3731, and is inserted into the unlocking hole 113 to drive the transmission portion 372 to slide relative to the housing 10, thereby making the cam body 371 rotate and eject the receiving tray 35.

The support portion 374 is mounted to the housing 10 and is positioned adjacent to the cam body 371. The support portion 374 includes a bottom support 3741 and a top support 3743. The bottom support 3741 is fixed to the housing 10, positioned upon the mounting slot 15, and adjacent to the mounting hole 131 of the fixing portion 13. A receiving slot 3745 is longitudinally defined in the bottom support 3741. The top support 3743 is mounted on and is covered upon the bottom support 3741.

In assembly, the support base 31 is fixedly mounted on the support portion 11, and received within the receiving space 115 of the housing 10. The resisting portion 313 is installed away from the end of the mounting slot 15. The receiving tray 35 is inserted into the housing 10 from the mounting slot 15 and slidably engages with the guiding latch slots 3151 of the support base 31. The distal end of the receiving tray 35 resists against the resisting portion 313 of the support base 31, and the operating portion 353 is received within the mounting slot 15. The cover 33 is mounted upon the support base 31, and fixed to the support portion 11 of the housing 10 for covering the receiving tray 35. The cam body 371 is rotatably assembled to the support portion 13 via the pin bolt 376 and the fixing cap 375, and positioned adjacent to the mounting slot 15. One end of the pin bolt 376 is fixed into the positioning hole 3715 of the cam body 371, the other end of the pin bolt 376 passes through the mounting hole 131 of the housing 10 and fixed with the fixing cap 375. A distance between the positioning hole 3715 and the resisting surface 3531 of the receiving tray 35 is substantially the same as the distance between the positioning hole 3715 and the periphery wall of the cam resisting portion 3713 of the cam body 371. The support portion 374 is mounted to the housing 10 adjacent to the cam body 371. The receiving slot 3745 aligns with the corresponding engaging slot 3717. The driving end 3728 slidably passes through the receiving slot 3745 and engages into the engaging slot 3717. The wedge-shaped main body 3721 is installed adjacent to the unlocking hole 113, and the driving slot 3725 aligns with the corresponding unlocking hole 113.

Referring to FIGS. 3 and 4, when unlocking and ejecting the receiving tray 35, the resisting end 3731 of the driving portion 373 is inserted into the unlocking hole 113 of the housing 10, and engaged into the driving slot 3725. Because the driving slot 3725 is disposed on an inclined surface of the transmission portion 372, when a pushing force is applied to the driving portion 373 along a direction substantially perpendicular to the transmission rod 3723. The wedge-shaped main body 3721 is pushed to slide toward the cam body 371, together with the transmission rod 3723, along the receiving slot 3745. The driving end 3728 engages with the engaging slot 3717 and pushes the cam body 371 to rotate. Meanwhile, the cam resisting portion 3713 slidably resists against the resisting surface 3531, thereby pushing and ejecting the receiving tray 35 from the receiving chamber of the support base 31 via the mounting slot 15 of the housing 10. The operating portion 353 is exposed from the mounting slot 15, thus, the receiving tray 35 can be slid out from the mounting slot 15 until the two latching stoppers 317 respectively latch into the corresponding two latching slots 3511. The user can insert a chip card into the receiving tray 35 and detach the chip card easily. The receiving tray 35 can be manually pushed and slid into the housing 10.

The transmission portion 372 can also be omitted, such that the driving portion 373 engages with the cam body 371 directly, thereby driving the cam body 371 to rotate to eject the receiving tray 35.

The chip card holding mechanism 30 has a simple structure, and is easy to operate. The receiving tray 35 is detachably assembled within the housing 10 via the unlocking assembly 37 for receiving the chip card. When the cam resisting portion 3713 is driven to rotate with the cam body 371, the cam resisting portion 3713 resists against and pushes the resisting surface 3531 towards the mounting slot 15, such that the chip card together with the receiving tray 35 can be easily ejected.

It is believed that the present embodiments and their advantages will be understood from the foregoing description, and it will be apparent that various changes may be made thereto without departing from the spirit and scope of the embodiments or sacrificing all of its material advantages.

What is claimed is:
1. A portable electronic device, comprising:
a housing defining a mounting slot and an unlocking hole adjacent to the mounting slot; and
a chip card holding mechanism assembled within the housing for holding a chip card, the chip card holding mechanism comprising:

a support base assembled within the housing and positioned adjacent to the mounting slot and the unlocking hole;

a receiving tray slidably mounted on the support base and comprising a tray body and an operating portion formed at one end of the tray body, the operating portion having a resisting surface; and an unlocking assembly for unlocking and ejecting the receiving tray, the unlocking assembly comprising:

a cam body rotatably assembled to the housing and positioned adjacent to the mounting slot, the cam body comprising a main portion and a resisting portion extending from the main portion and resisting against the resisting surface of the receiving tray; and a driving portion attached to the housing and insertable into the unlocking hole for driving the cam body to rotate thereby ejecting the receiving tray.

2. The portable electronic device of claim 1, wherein the cam body further comprises an engaging slot recessed from an outer peripheral surface of the cam resisting portion, and the driving portion has a resisting end engaging with the engaging slot of the cam body, thereby driving the cam body to rotate.

3. The portable electronic device of claim 1, wherein the support base comprises a support body, a resisting portion formed on a distal end of the support body, and two guiding portions oppositely and parallely formed at two sides of the support body; each of the guiding portions forms a guiding latch slot with the support body; two sides of the receiving tray slidably engages into the two guiding latch slots of the support base.

4. The portable electronic device of claim 3, wherein the receiving tray further comprises two latching slots oppositely defined in two sides of the tray body, and positioned adjacent to the distal end of the tray body away from the operating portion; the support base further comprises two latching stoppers oppositely formed on the two guiding portions corresponding to the two latching slots, and are oppositely positioned adjacent to two ends of the mounting slot; the two latching stoppers are capable of latching into the two corresponding latching slots to prevent the receiving tray from detaching from the housing.

5. The portable electronic device of claim 3, wherein the chip card holding mechanism further comprises a cover mounted upon the support base and fixed to the housing, and the cover and the support base cooperatively define a receiving chamber for receiving the receiving tray.

6. The portable electronic device of claim 5, wherein the housing comprises a support portion and a fixing portion formed on one end of the support portion; the support portion and the fixing portion cooperatively define a receiving space; the chip card holding mechanism is assembled within the receiving space; the mounting slot and the unlocking hole are separately defined through the fixing portion and communicate with the receiving space.

7. The portable electronic device of claim 6, wherein the fixing portion defines a mounting hole positioned between the mounting slot and the receiving space; the unlocking assembly further comprises a fixing cap and a pin bolt; the cam body defines a positioning hole corresponding to the mounting hole; one end of the pin bolt is fixed into the positioning hole of the cam body, and the other end of the pin bolt passes through the mounting hole of the housing and fixed with the fixing cap, such that the cam body is rotatably assembled to the support portion of the housing.

8. The portable electronic device of claim 7, wherein the chip card holding mechanism further comprises a transmission portion slidably mounted to the housing and engages with the cam body; the transmission portion comprises a main body and a transmission rod fixed to the main body; the main body defines a driving slot aligned with the unlocking hole; and the transmission rod comprises a driving end engaging with the engaging slot of the cam body for driving the cam body to rotate.

9. The portable electronic device of claim 8, wherein the chip card holding mechanism further comprises a support portion mounted to the housing and positioned adjacent to the cam body; the support portion defines a receiving slot aligned with the engaging slot of the cam body; the driving end of the transmission portion slidably passes through the receiving slot of the support portion and engages with the engaging slot of the cam body.

10. A chip card holding mechanism assembled within a housing, the housing defining a mounting slot and an unlocking hole adjacent to the mounting slot, the chip card holding mechanism comprising:

a support base mounted within the housing and positioned adjacent to the mounting slot and the unlocking hole;

a cover mounted upon the support base and cooperatively defining a receiving chamber together with the support base;

a receiving tray slidably assembled within the receiving chamber, and comprising a tray body and an operating portion formed at one end of the tray body; the operating portion having a resisting surface; and an unlocking assembly for unlocking and ejecting the receiving tray, the unlocking assembly comprising:

a cam body rotatably assembled to the housing and positioned adjacent to the mounting slot, the cam body comprising a cam main portion and a cam resisting portion extending from the cam main portion and resisting against the resisting surface of the receiving tray; and a driving portion insertable into the unlocking hole for driving the cam body to rotate thereby ejecting the receiving tray.

11. The chip card holding mechanism of claim 10, wherein cam body further comprises an engaging slot recessed from an outer peripheral surface of the cam resisting portion, and the driving portion has a resisting end engaging with the engaging slot of the cam body, thereby driving the cam body to rotate.

12. The chip card holding mechanism of claim 10, wherein the support base comprises a support body, a resisting portion formed on a distal end of the support body, and two guiding portions oppositely and parallely formed at two sides of the support body; each of the guiding portions forms a guiding latch slot with the support body; two sides of the receiving tray slidably engages into the two guiding latch slots of the support base.

13. The chip card holding mechanism of claim 12, wherein the receiving tray further comprises two latching slots oppositely defined in two sides of the tray body, and positioned adjacent to the distal end of the tray body away from the operating portion; the support base further comprises two latching stoppers oppositely formed on the two guiding portions, corresponding to the two latching slots, and are oppositely positioned adjacent to two ends of the mounting slot; the two latching stoppers are capable of latching into the two corresponding latching slots to prevent the receiving tray from detaching from the housing.

14. The chip card holding mechanism of claim 13, wherein the housing comprises a support portion and a fixing portion formed on one end of the support portion; the support portion and the fixing portion cooperatively define a receiving space; the chip card holding mechanism is assembled within the receiving space; the mounting slot and the unlocking hole are separately defined through the fixing portion and communicate with the receiving space.

15. The chip card holding mechanism of claim 14, wherein the fixing portion defines a mounting hole positioned between the mounting slot and the receiving space; the unlocking assembly further comprises a fixing cap and a pin bolt; the cam body defines a positioning hole corresponding to the mounting hole; one end of the pin bolt is fixed into the positioning hole of the cam body, and the other end of the pin bolt passes through the mounting hole of the housing and fixed with the fixing cap, such that the cam body is rotatably assembled to the support portion of the housing.

16. The chip card holding mechanism of claim 15, wherein the chip card holding mechanism further comprises a transmission portion slidably mounted to the housing and engages with the cam body; the transmission portion comprises a main body and a transmission rod fixed to the main body; the main body defines a driving slot aligned with the unlocking hole; the transmission rod comprises a driving end engaging with the engaging slot of the cam body for driving the cam body to rotate.

17. The chip card holding mechanism of claim 16, wherein the chip card holding mechanism further comprises a support portion mounted to the housing and positioned adjacent to the cam body; the support portion defines a receiving slot aligned with the engaging slot of the cam body; the driving end of the transmission portion slidably passes through the receiving slot of the support portion and engages with the engaging slot of the cam body.

* * * * *